Dec. 6, 1955  K. W. PFLEGER  2,725,788
COMBINED READING GLASS AND LIGHT
Filed Dec. 11, 1952
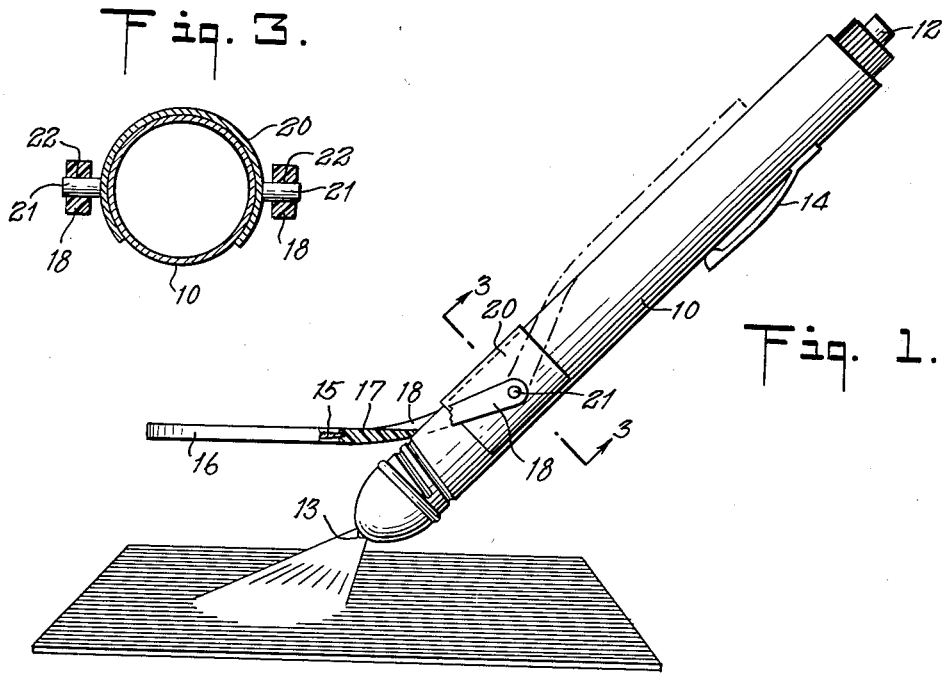
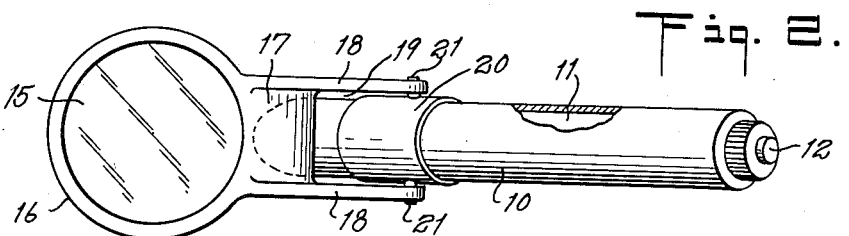
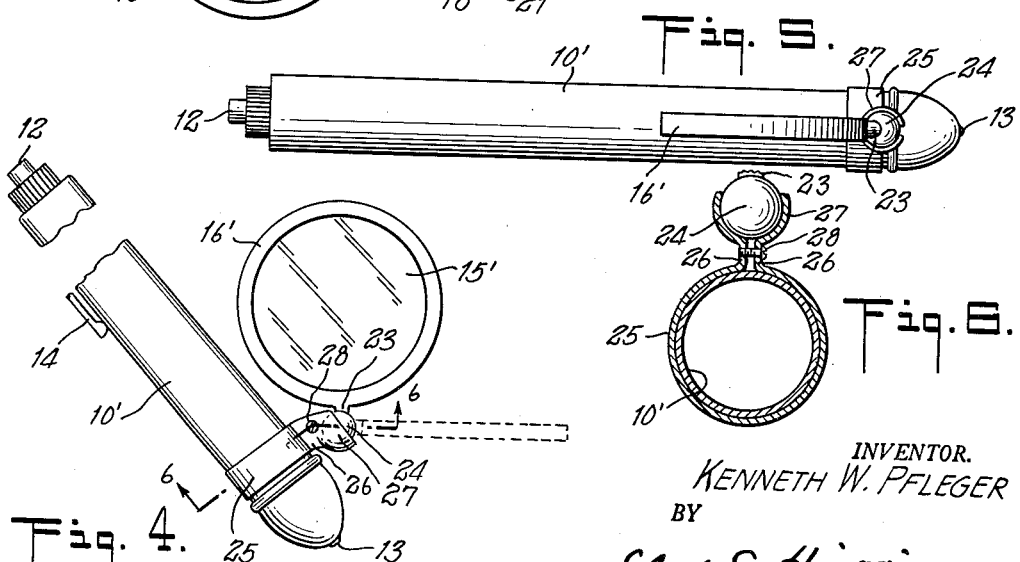
INVENTOR.
KENNETH W. PFLEGER
BY
Edw S. Higgins
ATTORNEY

United States Patent Office 2,725,788
Patented Dec. 6, 1955

2,725,788

COMBINED READING GLASS AND LIGHT

Kenneth W. Pfleger, Kearny, N. J.

Application December 11, 1952, Serial No. 325,387

1 Claim. (Cl. 88—39)

This invention relates generally to magnifying and illuminating devices and more particularly to a combined magnifying glass and flashlight.

A principal object of the present invention is to combine in one handy portable structure a magnifying lens and a source of illumination in such form and manner that the light rays will be substantially concentrated beneath the lens and not be broadly dissipated outside the area being examined.

Another object of the invention is to provide a combined battery-operated flashlight and lens in which the lens is hingedly and/or pivotally mounted on the flashlight so that it can be folded against the flashlight and so that the device can be readily inserted into and removed from a pocket in the clothing of the user, and may be supported in said pocket without showing any unsightly bulge, and so that the device may be placed in a purse or the like and take up a minimum of space.

Still another object of the invention is to provide a device of this kind with a shield in order to minimize any glare back at the user.

Yet another object of the invention is to provide a lens unit which may be readily mounted on any standard type of pocket flashlight.

A further object is to so construct the device that it is symmetrical with no sharp edges thereby preventing damage to clothing and the like.

A still further object is to provide a device of this kind in which the lens is slidably mounted along the flashlight in order to give a range of adjustment for the optical system.

It is further proposed to provide a clamp on the device whereby it may be clamped on any suitable support.

It is also proposed to provide a combined flashlight and lens in which the device assumes the optimum locations for light and lens, and which only requires one hand to manipulate.

Other objects of the invention are to provide a combined pocket flashlight and magnifying lens which is simple in construction, compact, free of outside wires, pleasing in appearance and economical to manufacture.

For a further comprehension of the invention and of the objects and advantages thereof, reference will be had to the following description and accompanying drawings and to the appended claim in which the various novel features of the invention are more particularly set forth.

In the accompanying drawings forming a material part of this disclosure:

Fig. 1 is a side elevational view of a combined flashlight and lens embodying one form of my invention, the lens being shown in collapsed position in dot-dash lines and parts being shown in section and broken away.

Fig. 2 is a plan view thereof, parts being shown broken away.

Fig. 3 is an enlarged horizontal sectional view taken on the plane of the line 3—3 of Fig. 1.

Fig. 4 is a side elevational view of a combined flashlight and lens embodying a modified form of the invention, the lens being shown in full lines in collapsed position and in dash lines in extended operative position.

Fig. 5 is a top plan view of the device of Fig. 4 with the lens in collapsed position.

Fig. 6 is an enlarged horizontal sectional view taken on the plane of the line 6—6 of Fig. 4.

Referring to Figs. 1 to 3, inclusive, a standard type of pocket, fountain-pen size of flashlight is illustrated having a cylindrical casing or barrel 10 housing a battery 11 and provided with a push button switch 12 at one end and an electric light bulb 13 at its other end. A conventional clip or clamp 14 is secured to the casing 10 as usual.

According to the present invention, a lens unit is operatively mounted on the casing 10 of the flashlight at the lamp end thereof. This unit includes a circular magnifying glass lens 15 having a frame 16, made of any suitable plastic material. The frame is formed with an integral plate 17 extending from one side thereof, which plate is slightly dished and tapers towards its inner end edge. The plate is also slightly opaque to provide a shield or shade for minimizing the glare back to the user. A pair of laterally extending integral supporting or stirrup arms 18 form the sides of the plate and continue outwardly of the plate leaving a space or clearance 19 between the plate and the outer ends of the arms. A split or semi-circular sleeve member or jacket 20 formed of springy metal is slidably clamped on the casing 10 of the flashlight and carries opposed pivot pins 21 which are secured thereto in any suitable manner. The pivot pins extend through openings 22 in the outer ends of the arms 18 whereby the arms straddle the casing 10 and the lens unit is hingedly connected thereto.

It is important that the field of illumination provided by the lamp bulb 13 be substantially concentrated, or at its maximum, just beneath the lens 15 when held at reading focus above the material to be examined. A dissipation of the light over a more widely spread area than that which is under magnification, or a much greater intensity at one side, detracts to a material extent from the usefulness of a device of this character in that the material is displayed under adverse rather than improved lighting conditions. For perfection of lighting conditions a nicety of adjustment of the lens to the lamp and control of the light rays are required. The control of the direction of the beams of the lamp bulb 13 to secure the desired "spotting" on the material of the lighted area is provided by holding the flashlight casing 10 at the proper angle, by moving the lens to the proper angular position relative to the flashlight casing and by sliding the supporting sleeve 20 to proper position along the flashlight casing.

In operation, the flashlight barrel or casing 10 serves as a handle and is held at an angle of approximately 45° with the plane of the copy to be read or area to be explored. The arms 18 of the lens frame 16 are initially swung to an angle of approximately 45° relative to the longitudinal axis of the flashlight casing, with the inner edge of the shielding plate 17 impinging against the casing and serving as a stop to limit said swinging movement and to support the lens 15 in a horizontal plane. The supporting sleeve 20 is then adjusted along the casing 10 to a position in proximity of the copy to be read or area explored. When the lamp bulb is illuminated, the copy or area becomes well illuminated. The shade or shield 17 is disposed between the eyes of the user and the lamp bulb 13 so that the radiation of the light rays of the lamp bulb is confined to a downwardly and forwardly inclined direction, and the eyes are thus protected from any direct rays that may come up from the lamp bulb or may be reflected from the subject copy due to light rays which strike same nearly perpendicularly.

The horizontal lines shown in perspective in Fig. 1 indicate the surface of some material to be examined, spaced from the lens 15 at a normal reading focus. The fainter oblique lines indicate the main direct light rays from the lamp bulb, the arrangement of the lamp bulb, lens and shielding plate being such that the projection of the beams of light are controlled and the more intense portion of the illuminated area is confined to that portion of the reading surface which is magnified by the lens 15.

When the device is not in use and it is desired to insert the same in the pocket of a vest or the like, the arms 18 of the lens unit are swung on an arc bringing the lens inwardly to a position alongside the flashlight casing 10 as shown in dot-dash lines in Fig. 1. The construction and shape of the lens 15 and its mounting are such that the lens lies flat against the flashlight casing thereby increasing the width of the flashlight casing only slightly and presenting no sharp projections so that the device readily slips into the pocket where it takes up but a minimum of space and is held therein by the clip 14. The device can just as readily be removed from the pocket. It will be understood that when the lens is collapsed the device may also very readily be inserted into a purse, bag or the like, taking up a minimum of space.

In Figs. 4 to 6, inclusive, a modified form of lens unit is shown. In this form of the invention, the lens 15' has a circular frame 16'. The frame is provided with an integral arm 23 extending laterally thereof, which arm terminates in an integral spherical member or ball 24. A split sleeve or ring 25 of springy metal is slidably mounted on the flashlight casing 10' adjacent its lamp end. The ends 26 of the sleeve extend laterally of the sleeve and terminate in a semi-circular ball seat 27, said seat being disposed on a plane offset from the plane of the body of the sleeve as seen in Fig. 4. The ball 24 fits in the seat 27 and is clamped therein by setting up on a screw 28 passing through the lateral ends of the sleeve. By reason of this universal joint between the lens and flashlight casing 10', the lens 15' is hingedly and pivotally mounted so that it may be readily swung to operative horizontal position as shown in dash lines in Fig. 4 for reading purposes, and when not in use may be rotated 90° to bring the body of the lens 15' into the plane of the body of the casing 10' of the flashlight and then may be swung inwardly toward the casing. It will be noted that the downward movement of the lens is limited by the edge of the ball seat 27. When the lens 15' is thus collapsed, the device may be readily inserted into a pocket and just as readily removed therefrom, and because of the alignment of the casing and lens no unsightly bulge appears on the pocket.

In all other respects, the form of the invention shown in Figs. 4 to 6 is similar to the form of the invention shown in Figs. 1 to 3 and similar reference numerals are used to indicate similar parts.

It will be seen that the device is portable and is capable of being used with only one hand for a variety of purposes, such as reading fine print in telephone directories, or other works with fine print, searching for mechanical imperfections in miniaturized telephone office equipment, working on complex equipment or on watches, jewelry, engravings and typesetting, performing delicate surgical operations, for detective work of all kinds, and for numerous other purposes.

While I have illustrated and described the preferred embodiments of my invention, it is to be understood that I do not limit myself to the precise constructions herein disclosed and the right is reserved to all changes and modifications as defined in the appended claim.

I claim:

In combination, a pocket-sized battery-operated flashlight having a cylindrical casing and a lamp bulb, a magnifying glass lens, a frame around said lens, a plate formed integrally with said frame and extending laterally thereof, spaced arms carried by said plate and extending outwardly therefrom, a slidable sleeve on said casing, opposed pivot pins carried by said sleeve and being pivotally connected to said arms, said plate being arranged over the lamp bulb and being opaque to serve as a shade for the lamp bulb, the free end edge of the plate being adapted to engage the flashlight casing upon swinging movement of the lens to operative position so as to limit said swinging movement of the lens, said plate being tapered and dished so as to lie flat against the flashlight casing when the lens is swung to collapsed condition.

References Cited in the file of this patent

UNITED STATES PATENTS

| | | |
|---|---|---|
| 1,449,165 | Cameron | Mar. 20, 1923 |
| 1,556,510 | King | Oct. 6, 1925 |
| 1,557,605 | O'Meara | Oct. 20, 1925 |
| 1,886,747 | Schroder | Nov. 8, 1932 |
| 1,925,393 | Lehman | Sept. 5, 1933 |
| 2,326,343 | Eichenberger | Aug. 10, 1943 |
| 2,388,476 | Esdaile | Nov. 6, 1945 |

FOREIGN PATENTS

| | | |
|---|---|---|
| 814,727 | France | June 28, 1937 |